United States Patent
Martinez et al.

(10) Patent No.: US 9,851,985 B2
(45) Date of Patent: Dec. 26, 2017

(54) PLATFORM CONFIGURATION MANAGEMENT USING A BASIC INPUT/OUTPUT SYSTEM (BIOS)

(71) Applicant: Dell Products L.P., Round Rock, TX (US)

(72) Inventors: Ricardo Luis Martinez, Leander, TX (US); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 318 days.

(21) Appl. No.: 14/504,218

(22) Filed: Oct. 1, 2014

(65) Prior Publication Data

US 2016/0098283 A1 Apr. 7, 2016

(51) Int. Cl.
*G06F 9/445* (2006.01)

(52) U.S. Cl.
CPC .................. *G06F 9/44505* (2013.01)

(58) Field of Classification Search
CPC .................................................. G06F 9/44505
See application file for complete search history.

(56) References Cited

U.S. PATENT DOCUMENTS

| | | | | |
|---|---|---|---|---|
| 2003/0074548 A1* | 4/2003 | Cromer | ................ | G06F 21/575 713/1 |
| 2003/0084278 A1* | 5/2003 | Cromer | ................ | G06F 9/4406 713/2 |
| 2003/0084285 A1* | 5/2003 | Cromer | ................ | G06F 21/575 713/164 |
| 2009/0070598 A1* | 3/2009 | Cromer | ................ | G06F 21/575 713/193 |
| 2010/0115625 A1* | 5/2010 | Proudler | ............... | G06F 21/445 726/27 |
| 2010/0161998 A1* | 6/2010 | Chen | ....................... | G06F 21/57 713/189 |
| 2011/0208955 A1* | 8/2011 | Anbazhagan | ......... | G06F 9/4401 713/2 |
| 2012/0011352 A1* | 1/2012 | Shimatani | ............. | G06F 9/4401 713/1 |
| 2013/0166894 A1* | 6/2013 | Wang | .................. | G06F 11/2284 713/2 |

(Continued)

OTHER PUBLICATIONS

"Trusted Execution Technology" from Wikipedia at http://en.wikipedia.org/wiki/Trusted_Execution_Technology, printed Oct. 1, 2014, 4 pages.

(Continued)

*Primary Examiner* — Thomas Lee
*Assistant Examiner* — Chad Erdman
(74) *Attorney, Agent, or Firm* — Baker Botts L.L.P.

(57) ABSTRACT

Methods and systems for platform configuration management may use a platform configuration register (PCR) stored on a trusted platform module (TPM) included with an information handling system. A basic input/output system (BIOS) may include instructions to generate a first PCR value based on BIOS settings while a user is operating the BIOS. When the first PCR value indicates a change from a previous PCR value stored in the PCR, an alert may be displayed to the user and sent to a network administrator. The BIOS may display an indication of a mapping of BIOS settings to the first PCR value.

18 Claims, 2 Drawing Sheets

(56) References Cited

U.S. PATENT DOCUMENTS

| | | | |
|---|---|---|---|
| 2013/0174220 A1* | 7/2013 | Berg | H04W 12/10 726/3 |
| 2014/0089660 A1* | 3/2014 | Sarangshar | H04L 9/3234 713/156 |
| 2014/0095886 A1* | 4/2014 | Futral | G06F 21/572 713/187 |
| 2014/0304520 A1* | 10/2014 | Bobzin | G06F 21/572 713/187 |

OTHER PUBLICATIONS

"Trusted Platform Module" from Wikipedia at http://en.wikipedia.org/wiki/Trusted_Platform_Module, printed Oct. 1, 2014, 6 pages.

* cited by examiner

PLATFORM CONFIGURATION MANAGEMENT USING A BASIC INPUT/OUTPUT SYSTEM (BIOS)

BACKGROUND

Field of the Disclosure

This disclosure relates generally to information handling systems and more particularly to platform configuration management using a basic input/output system (BIOS).

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In certain information handling systems, a basic input/output system (BIOS) may include BIOS firmware for various hardware management tasks.

SUMMARY

In one aspect, a disclosed method for platform configuration management includes accessing a mapping of basic input/output system (BIOS) settings to a platform configuration register (PCR) for an information handling system including a trusted platform module (TPM). During operation of the BIOS by a user and based on the BIOS settings and the mapping, the method may include generating a first PCR value indicative of BIOS settings currently selected by the user, the first PCR value corresponding to the PCR. When the first PCR value indicates a change from a previous PCR value stored in the PCR, the method may include displaying a first alert in a BIOS user interface, the first alert indicating that the BIOS settings have changed the first PCR value.

Other disclosed aspects include article of manufacture comprising a non-transitory computer-readable medium storing instructions executable by a processor, and the information handling system comprising a processor subsystem having access to the BIOS.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
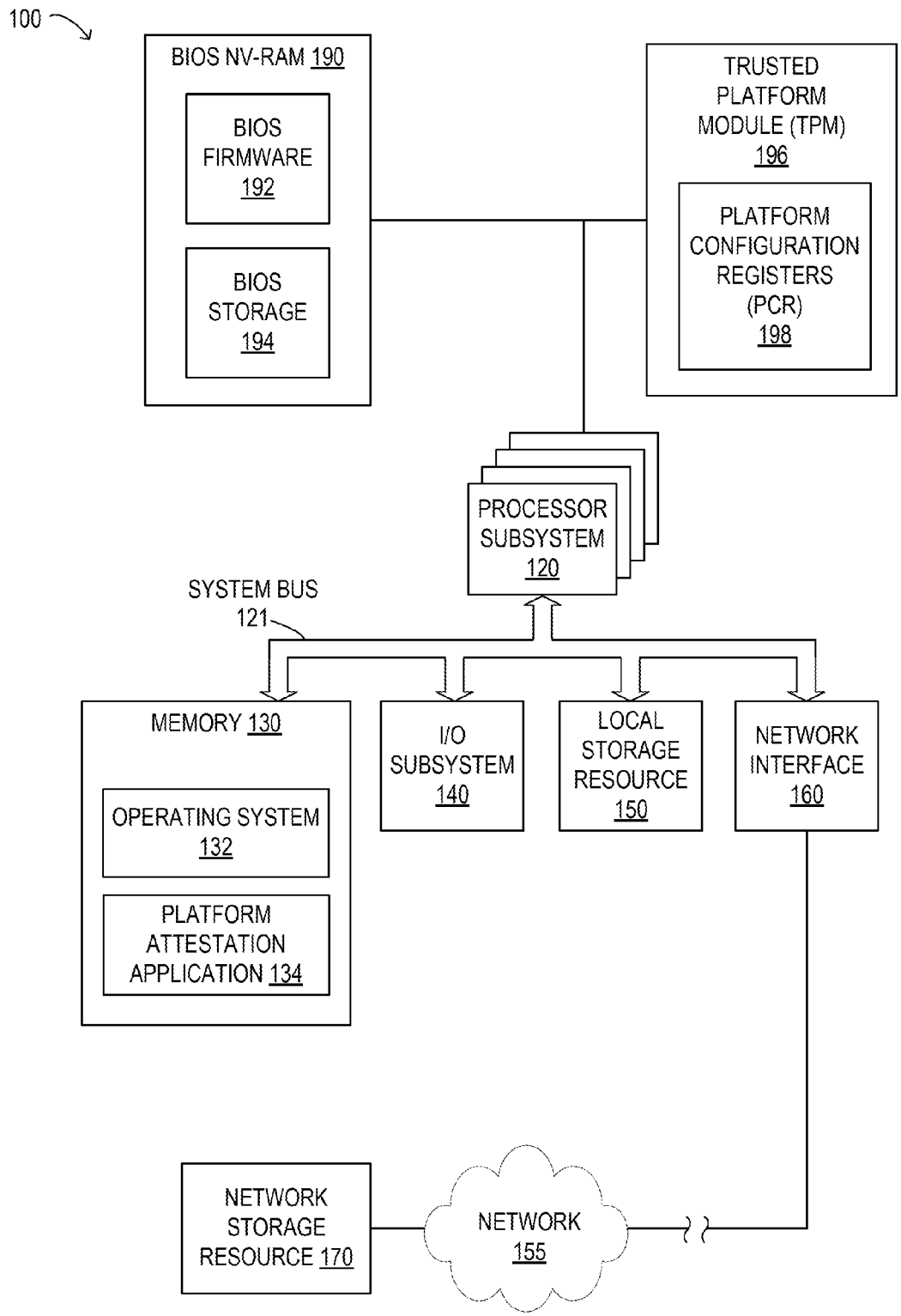
FIG. 1 is a block diagram of selected elements of an embodiment of an information handling system for platform configuration management using a BIOS.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, certain information handling systems may include BIOS firmware that may control certain hardware elements and may provide for user management of the hardware elements. A BIOS non-volatile memory may store BIOS firmware that performs various operations for platform configuration management on an information handling system that includes a trusted platform module (TPM). Firstly, the BIOS firmware may perform attestation measurements and store resulting attestation data in the TPM. For example, for platform configuration of the information handling system, the attestation data may be stored in specific platform configuration registers (PCR) of the TPM. For example, PCR1 may be used to store attestation data for host platform configuration, which may include BIOS settings. Other PCR registers may store other types of attestation data for platform configuration.

In conventional information handling systems, a user change to a BIOS setting may result in a change to a PCR value that is measured by the BIOS and stored as attestation data upon a next reboot. However, because of the change to the PCR value, platform attestation of the information handling system may fail after the next reboot, which may undesirably prevent a user from accessing desired functionality of the information handling system. For example, a platform attestation application may recognize the change and may prevent the information handling system from booting. In another example, public-key infrastructure (PKI) used for network authentication may prevent network access by the information handling system.

As will be described in further detail herein, a BIOS firmware may be modified to make potential alterations of PCR values associated with BIOS settings visible to a user before the actual PCR on the TPM is written. For example, the BIOS may display a user alert when a BIOS settings change results in a change in a PCR value.

Figure 2:
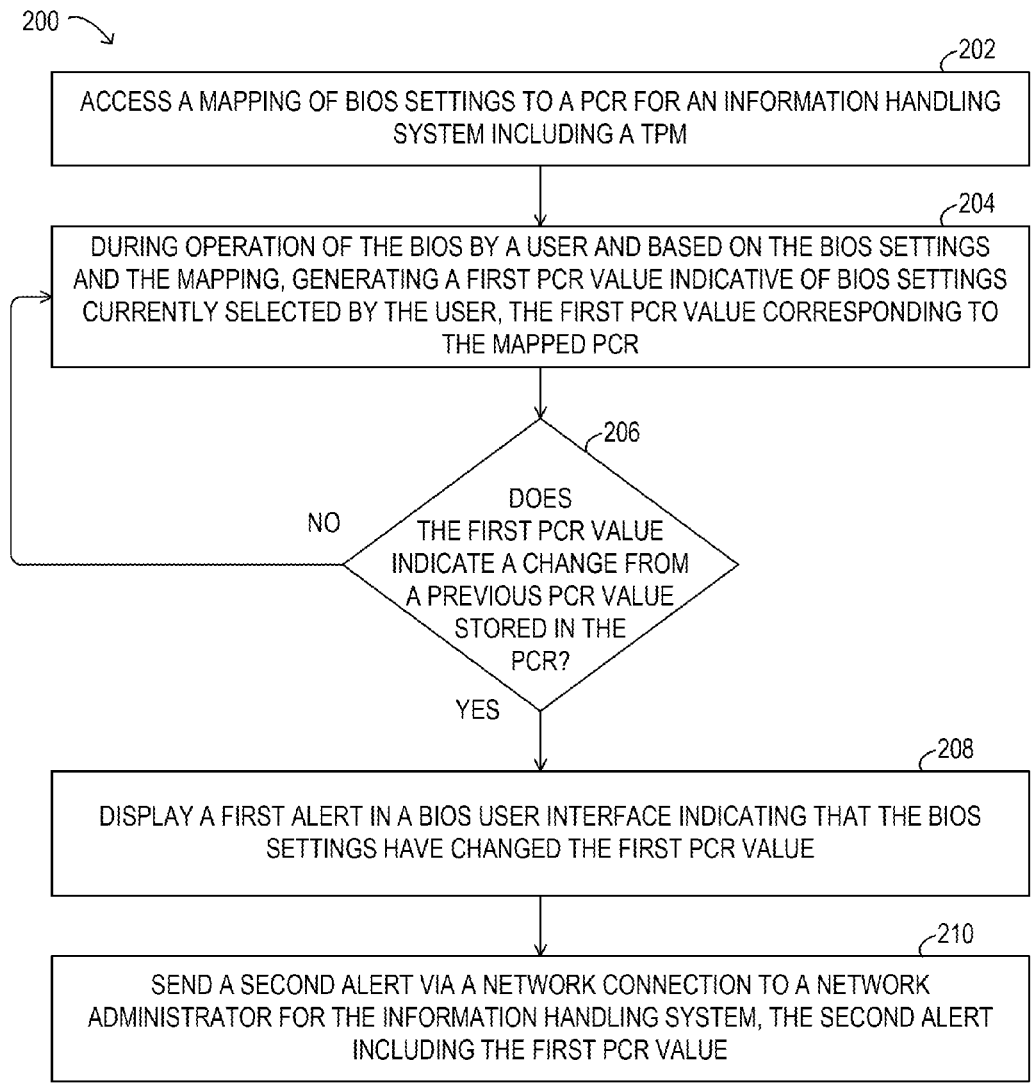
FIG. 2 is a flowchart depicting selected elements of an embodiment of a method for platform configuration management using a BIOS.

Particular embodiments are best understood by reference to FIGS. 1 and 2, wherein like numbers are used to indicate like and corresponding parts.

Turning now to the drawings, FIG. 1 illustrates a block diagram depicting selected elements of an embodiment of information handling system 100. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130). In the same or alternative embodiments, processor subsystem 120 may interpret and/or execute program instructions and/or process data stored remotely (e.g., in a network storage resource).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 155 As shown, memory 130 may also store platform attestation application 134, which may access BIOS storage 194 and PCRs 198 and attest to platform integrity of information handling system 100. Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In certain embodiments, I/O subsystem 140 may comprise a touch panel and/or a display adapter. The touch panel (not shown) may include circuitry for enabling touch functionality in conjunction with a display (not shown) that is driven by display adapter (not shown).

Also shown in FIG. 1 is BIOS non-volatile random access memory (NV-RAM) 190, often simply or collectively referred to as the 'BIOS'. As shown, BIOS NV-RAM 190 may include BIOS firmware 192, representing pre-boot instructions executable by processor subsystem 120, for example, for preparing information handling system 100 to boot by activating various hardware components in preparation of launching operating system 132 for execution. BIOS firmware 192 may further include instructions for displaying a user interface by which a user may access, modify, and store BIOS settings. Also shown stored in BIOS NV-RAM 190 is BIOS storage 194, which may represent data, such as program code, settings, PCR values, etc. that BIOS firmware 192 may store. In certain embodiments, BIOS firmware 192 may have access to network interface 160 for various types of communication, such as with a network administrator. In certain embodiments, at least a portion of BIOS storage 194 may physically reside on a remote storage resource, such as in network storage resource 170.

Also in FIG. 1 is trusted platform module (TPM) 196, which may represent a physical component included with information handling system 100. TPM 100 may comply with any of a variety of industry standard technical specifications for TPMs, such as International Organization for Standardization (ISO)/International Electrotechnical Commission (IEC) 11889. Thus, while TPM 196 may include various elements and functionality, for the purposes of the present disclosure, TPM 196 is shown including platform configuration registers (PCRs) 198. PCRs 198 may include various registers for different purposes. A non-limiting listing of certain elements included in PCRs 198 is included in Table 1.

TABLE 1

PCR components in a TPM

| PCR | Label | Description |
| --- | --- | --- |
| PCR0 | CRTM, BIOS code, and host platform extension | static core root of trust measurement, performed first by a processor |
| PCR1 | Host platform configuration | measured by BIOS |
| PCR2 | Option Read-Only Memory (ROM) code | measured by BIOS |
| PCR3 | Option ROM configuration and data | measured by BIOS |
| PCR4 | Initial Program Loader (IPL) Code - Master Boot Record (MBR) | measured by BIOS |
| PCR5 | IPL code configuration and data | measured by BIOS |
| PCR6 | State transition and wake events | measured by BIOS |
| PCR7 | Host platform manufacturer control | measured by BIOS |

In operation, when information handling system 100 is powered on, BIOS firmware 192 may be launched and may execute. As referred to herein, BIOS firmware 192 may represent instructions executing on processor subsystem 120. It is noted that other processors and/or processor subsystems, such as an embedded controller (EC) or a secondary processor (not shown), may be used to execute BIOS firmware 192 in various embodiments. When BIOS firmware 192 executes prior to booting operating system 132, BIOS firmware 192 may make certain PCR measurements, which are recorded in PCRs 198. BIOS firmware 192 may also enable a user interface to be activated upon bootup that allows a user to modify certain BIOS settings. Certain ones of the BIOS settings may be associated with certain PCR values. For example, BIOS settings that involve hardware configuration changes may affect a value stored in PCR1 (upon a next reboot of the information handling system). Thus, a user may inadvertently make a change to a BIOS setting and at a later time reboot the information handling system. When the change in the BIOS setting results in a change of PCRs 198, at least some functionality associated with information handling system 100 may become blocked, as described previously.

Therefore, BIOS firmware 192 may include functionality for platform configuration management, as described herein. BIOS firmware 192 may access a mapping of BIOS settings to changes in PCRs 198. In one embodiment, the mapping may be generated upon compilation of BIOS firmware 192, for example, by a vendor of BIOS firmware 192. The mapping may be stored in BIOS storage 194. Then, during operation of the BIOS user interface and based on the current BIOS settings and the mapping, BIOS firmware 192 may generate a first PCR value indicative of BIOS settings currently selected by the user. The first PCR value may correspond to a given one of PCRs 198, for example PCR1. When a user makes a change to the BIOS settings that would result in a change to PCRs 198, BIOS firmware 192 may present the user with a corresponding first alert that may be displayed in the user interface. The first alert may indicate to the user which BIOS settings, or which changes to the BIOS settings, will cause PCRs 198 to change. BIOS firmware 192 may also display instructions to the user for reverting the BIOS settings to a state that is compatible with a previous PCR values stored in PCRs 198.

Furthermore, BIOS firmware 192 may send a second alert to a network administrator for information handling system 100, including the first PCR value. BIOS firmware 192 may further display PCR-related settings, based on the mapping, with a corresponding indication, such as a different background color than non-PCR-related settings, for example.

Turning now to FIG. 2, a block diagram of selected elements of an embodiment of method 200 for platform configuration management using a BIOS is depicted in flowchart form. Method 200 may be performed using information handling system 100 (see FIG. 1). It is noted that certain operations described in method 200 may be optional or may be rearranged in different embodiments.

Method 200 may begin by accessing (operation 202) a mapping of BIOS settings to a PCR for an information handling system including a TPM. During operation of the BIOS by a user and based on the BIOS settings and the mapping, a first PCR value may be generated (operation 204) that is indicative of BIOS settings currently selected by the user, the first PCR value corresponding to the mapped PCR. Then, a decision may be made whether the first PCR value indicates (operation 206) a change from a previous PCR value stored in the PCR. It is noted that the first PCR value may represent current BIOS settings, while the previous PCR value may be a cumulative value that represents a plurality of previous BIOS settings. When the result of operation 206 is NO, method 200 may loop back to operation 204. When the result of operation 206 is YES, a first alert may be displayed (operation 208) in a BIOS user interface indicating that the BIOS settings have changed the first PCR value. When the first alert is displayed, an indication of which BIOS settings have resulted in the change to the first PCR value may be displayed in the BIOS user interface. When the first alert is displayed, user instructions for restoring the BIOS to correspond to the previous PCR value may be displayed in the BIOS user interface. Then, a second alert may be sent (operation 210) via a network connection to a network administrator for the information handling system, the second alert including the first PCR value. The network administrator may receive the second alert and may take corresponding actions to prevent lockout of the information handling system. In this manner, many undesirable instances of lockout of an information handling system may be prevented or pro-actively managed, according to the methods described herein.

Disclosed methods and systems for platform configuration management may use a platform configuration register (PCR) stored on a trusted platform module (TPM) included with an information handling system. A BIOS may include instructions to generate a first PCR value based on BIOS settings while a user is operating the BIOS. When the first PCR value indicates a change from a previous PCR value stored in the PCR, an alert may be displayed to the user and sent to a network administrator. The BIOS may display an indication of a mapping of BIOS settings to the first PCR value.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for identifying a change in platform configuration register values selected by a user via BIOS user interface comprising:
    accessing a mapping of basic input/output system (BIOS) settings to a platform configuration register (PCR) for an information handling system including a trusted platform module (TPM), wherein the BIOS settings are accessible for selection by a user of the information handling system from a BIOS user interface;
    during operation of the BIOS user interface by the user and based on the BIOS settings and the mapping, generating a first PCR value indicative of BIOS settings currently selected by the user, the first PCR value corresponding to the PCR;
    when the first PCR value indicates a change from a previous PCR value stored in the PCR, displaying a first alert in the BIOS user interface, the first alert indicating that the BIOS settings have changed the first PCR value; and
    when the first alert is displayed, sending a second alert via a network connection to a network administrator for the information handling system to perform an action, the second alert including the first PCR value.

2. The method of claim 1, further comprising:
    when the first alert is displayed, displaying in the BIOS user interface an indication of which BIOS settings have resulted in the change to the first PCR value.

3. The method of claim 2, further comprising:
    when the first alert is displayed, displaying in the BIOS user interface user instructions for restoring the BIOS to correspond to the previous PCR value.

4. The method of claim 1, wherein the action is to prevent lockout of the information handling system.

5. The method of claim 1, further comprising:
    displaying, in the BIOS user interface, an indication of the mapping of the BIOS settings to the PCR.

6. The method of claim 1, wherein the PCR is a PCR1 corresponding to a host platform configuration.

7. An information handling system for identifying a change in a platform configuration register values selected by a user via BIOS user interface comprising:
    a processor subsystem having access to a basic input/output system (BIOS), wherein the BIOS includes BIOS instructions executable by the processor subsystem to:
        generate a BIOS user interface for enabling a user to access and select BIOS settings for the BIOS;
        access a mapping of the BIOS settings to a platform configuration register (PCR) for an information handling system including a trusted platform module (TPM);
        during operation of the BIOS user interface by the user and based on the BIOS settings and the mapping, generate a first PCR value indicative of BIOS settings currently selected by the user, the first PCR value corresponding to the PCR;
        when the first PCR value indicates a change from a previous PCR value stored in the PCR, display a first alert in the BIOS user interface, the first alert indicating that the BIOS settings have changed the first PCR value; and
        when the first alert is displayed, send a second alert via a network connection to a network administrator for the information handling system to perform an action, the second alert including the first PCR value.

8. The information handling system of claim 7, further comprising BIOS instructions to:
    when the first alert is displayed, display in the BIOS user interface an indication of which BIOS settings have resulted in the change to the first PCR value.

9. The information handling system of claim 8, further comprising BIOS instructions to:
    when the first alert is displayed, display in the BIOS user interface user instructions for restoring the BIOS to correspond to the previous PCR value.

10. The information handling system of claim 7, wherein the action is to prevent lockout of the information handling system.

11. The information handling system of claim 7, further comprising BIOS instructions to:
    display, in the BIOS user interface, an indication of the mapping of the BIOS settings to the PCR.

12. The information handling system of claim 7, wherein the PCR is a PCR1 corresponding to a host platform configuration.

13. An article of manufacture comprising a non-transitory computer-readable medium storing instructions, the instructions representing a basic input/output system (BIOS) that identifies a change in a platform configuration register values selected by a user via BIOS user interface, that, when executed by a processor of an information handling system, cause the processor to:
- generate a BIOS user interface for enabling a user to access and select BIOS settings for the BIOS;
- access a mapping of the BIOS settings to a platform configuration register (PCR) for an information handling system including a trusted platform module (TPM);
- during operation of the BIOS user interface by the user and based on the BIOS settings and the mapping, generate a first PCR value indicative of BIOS settings currently selected by the user, the first PCR value corresponding to the PCR;
- when the first PCR value indicates a change from a previous PCR value stored in the PCR, display a first alert in the BIOS user interface, the first alert indicating that the BIOS settings have changed the first PCR value; and
- when the first alert is displayed, send a second alert via a network connection to a network administrator for the information handling system to perform an action, the second alert including the first PCR value.

14. The article of manufacture of claim 13, further comprising BIOS instructions to:
- when the first alert is displayed, display in the BIOS user interface an indication of which BIOS settings have resulted in the change to the first PCR value.

15. The information handling system of claim 14, further comprising BIOS instructions to:
- when the first alert is displayed, display in the BIOS user interface user instructions for restoring the BIOS to correspond to the previous PCR value.

16. The article of manufacture of claim 13, wherein the action is to prevent lockout of the information handling system.

17. The article of manufacture of claim 13, further comprising BIOS instructions to:
- display, in the BIOS user interface, an indication of the mapping of the BIOS settings to the PCR.

18. The article of manufacture of claim 13, wherein the PCR is a PCR1 corresponding to a host platform configuration.

* * * * *